United States Patent [19]

Kato

[11] 3,909,076

[45] Sept. 30, 1975

[54] DUST SEAL FOR ENDLESS TRACKS OF A TRACTOR

[75] Inventor: Takeshi Kato, Hirakata, Japan

[73] Assignee: Kabushiki Kaisha Komatsu Seisakusho, Tokyo, Japan

[22] Filed: Feb. 7, 1973

[21] Appl. No.: 330,398

[52] U.S. Cl. .................................. 305/11; 277/95
[51] Int. Cl.² ........................................ F16J 15/38
[58] Field of Search ................... 305/11; 277/95, 92

[56] References Cited
UNITED STATES PATENTS

| | | | |
|---|---|---|---|
| 1,993,268 | 3/1935 | Ferguson | 277/92 X |
| 2,906,562 | 9/1959 | Burgman | 305/11 |
| 3,244,457 | 4/1966 | Ross | 305/11 |
| 3,554,560 | 1/1971 | Miyake | 277/92 |

*Primary Examiner*—Philip Goodman
*Assistant Examiner*—John A. Carroll
*Attorney, Agent, or Firm*—Armstrong, Nikaido & Wegner

[57] ABSTRACT

Dust seal for endless tracks of a tractor having a pin, a first link secured to the pin and having annular recess, a bushing rotatably engaged with the pin and projected at one end into the recess of the first link to form a counter bore portion, and a second link secured to the bushing, which has an annular sealing member of wear resistance and resiliency forming sealing surfaces at both sides thereof with the end surface of the bushing and with the bottom surface of the recess of the first link and having at least one annular thread and contained in the recess of the first link in compressed state. Thus, the dust seal may have good sealing function and may endure thrust.

3 Claims, 7 Drawing Figures

DUST SEAL FOR ENDLESS TRACKS OF A TRACTOR

This invention relates to tracks of a tractor, and more particularly to improvements of a dust seal for endless tracks of a tractor.

The conventional dust seal of this type having good sealing function cannot endure a thrust force, while the dust seal endurable for the thrust force has bad sealing function. More in detail, the conventional dust seal having sealing member combined with polyurethane rubber having relatively good sealing function and foam polyurethane rubber is impossible for enduring large thrust force, and lacks wear resistance of foam polyurethane rubber, and if it absorbs dirty water and is dried, it loses resiliency as its disadvantage. The other conventional dust seal having leaf springs is possible for enduring the thrust force, but since it has narrow sealing width due to its linear contact, it has bad sealing function.

This invention contemplates to eliminate the aforementioned disadvantages of the conventional dust seal of the tracks of the tractor and to provide an improved dust seal for tracks of a tractor.

It is an object of the present invention to provide a dust seal for tracks of a tractor which has good sealing function.

It is another object of the present invention to provide a dust seal for tracks of a tractor which may endure a thrust force.

It is a further object of the present invention to provide a dust seal for tracks of a tractor which may prevent earth and sand and dirty water from entering thereinto.

According to one aspect of the present invention, there is provided a dust seal for endless tracks of a tractor having a pin, a first link secured to the pin and having annular recess, a bushing rotatably engaged with the pin and projected at one end into the recess of the first link to form a counter bore portion, and a second link secured to the bushing, which comprises an annular sealing member of wear resistance and resiliency forming sealing surfaces at both sides thereof with the end surface of the bushing and with the bottom surface of the recess of the first link and having at least one annular thread and contained in the recess of the first link in compressed state.

These and other features and advantages of the present invention will become more apparent from the following description taken in conjunction with the accompanying drawings, in which.

For better understanding of the dust seal of the present invention, the conventional dust seal will now be described with reference to FIGS. 1A and 1B, which show the conventional examples of the dust seal.

Figure 1A:
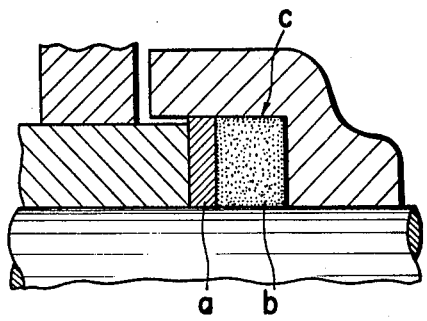
FIGS. 1A and 1B are longitudinal sectional views of the conventional dust seal for tracks of the tractor.
Figure 1B:
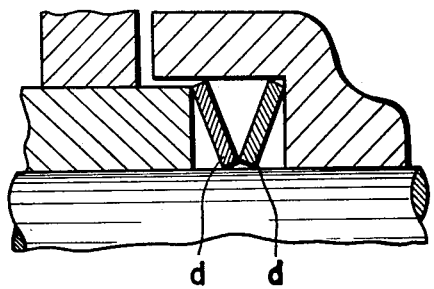

As shown in FIG. 1A, the conventional dust seal having sealing member c combined with polyurethane rubber a having relatively good sealing function and foam polyurethane rubber b is impossible for enduring large thrust force, and lacks wear resistance of foam polyurethane rubber $b$, and if it absorbs dirty water and is dried, it loses resiliency as its disadvantages. Another conventional dust seal shown in FIG. 1B having leaf springs $d$ and $d$ is possible for enduring the thrust force, but since it has narrow sealing width due to its linear contact, it has bad sealing function.

Figure 2:
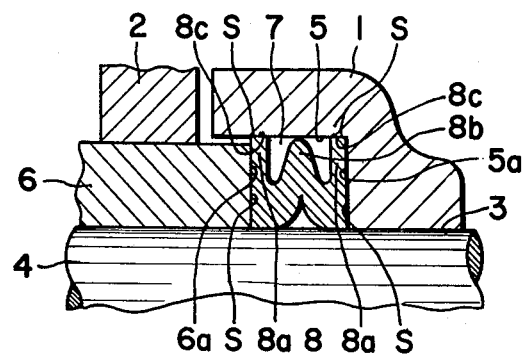
FIG. 2 is a longitudinal sectional view partly omitted of one embodiment of the dust seal for tracks of a tractor according to the present invention.
Figures 3, 4:
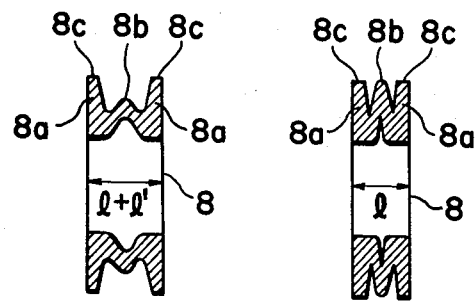
FIG. 3 is a longitudinal sectional view of the sealing member before assembled for the use of the dust seal of this invention.
FIG. 4 is a longitudinal sectional view of the sealing member after assembled in the dust seal of this invention.

Reference is now made to FIGS. 2 to 6, and particularly to FIGS. 2 to 4, which show one embodiment of the dust seal for endless tracks of a tractor of the present invention.

In the drawings, reference numerals 1 and 2 represent links, and a pin 4 is press-fitted into the hole 3 of the link 1. An annular recess 5 is formed coaxially with the hole 3 of the link 1. A bushing 6 is mounted onto the pin 4 in such a manner that the end of the bushing 6 is inserted into the annular recess 5 to form a counter bore portion 7. The link 2 is mounted onto the bushing 6. A sealing member 8 is contained in the counter bore portion 7. This sealing member 8 has annular side edges 8a and 8a, and a thread 8b to form substantially W shape in section, and is made of urethane rubber, synthetic resin, natural rubber of wear resistance and metal of wear resistance having resiliency. This sealing member 8 becomes l + l' longer in free state than the set length l contained in the counter bore portion 7 of the dust seal as an initial state in compressed condition. The side edges 8a and 8a of the sealing member 8 are closely contacted with the bottom surface 5a of the recess 5 of the link 1 and the end surface 6a of the bushing 6, respectively to form sealing surfaces S, and the outer peripheral surfaces 8c and 8c of the sealing member 8 are closely contacted with the inner side peripheral surface of the recess 5 of the link 1 to form sealing surfaces S.

In operation of thus constructed dust seal of this invention, earth and sand entered through the gap of the links 1 and 2 are prevented from entering between the pin 4 and the bushing 6 by the sealing surfaces S. Since the sealing member 8 is inserted into the counter bore portion 7 in compressed state, it may endure considerable thrust force. Further, since the sealing member 8 is compressed in the amount l' in the counter bore portion 7, it may follow the longitudinal movements of the bushing 6 along the pin 4 to always form sealing surfaces S.

Figure 5:
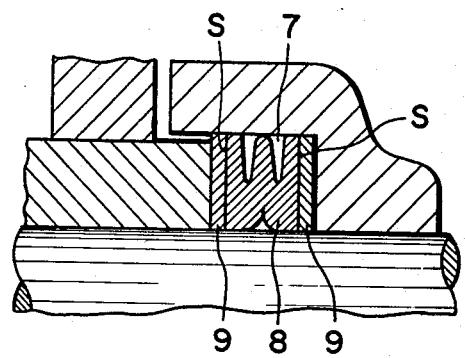
FIG. 5 is a longitudinal sectional view of another embodiment of the dust seal of the present invention.

Referring now to FIG. 5, which shows another embodiment of the dust seal for endless tracks of a tractor of this invention, wear resistant plates 9 and 9 are disposed at both sides of the sealing member 8 in the counter bore portion 7 of the dust seal of this invention so that both side surfaces of the sealing member 8 are closely contacted with the wear resistant plates 9 and 9, respectively to form sealing surfaces S. And, they operate similarly to the above embodiment.

Figure 6:
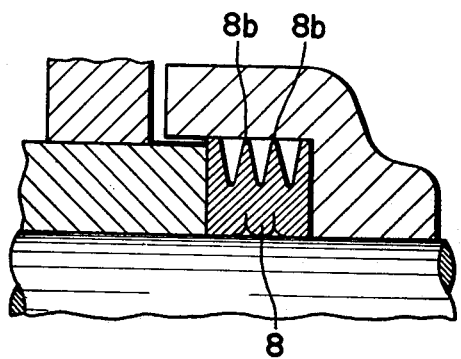
FIG. 6 is a longitudinal sectional view of still another embodiment of the dust seal of the present invention.

Reference is now made to FIG. 6, which show still another embodiment of the dust seal of the present invention.

This embodiment of the dust seal has two threads 8*b*, and operates similarly to the above embodiments.

It should be understood from the foregoing description that since the dust seal for endless tracks of a tractor of this invention is so constructed as to have a pin 4, a first link 1 secured to the pin 4 and having annular recess 5, a bushing 6 rotatably engaged with the pin 4 and projected at one end into the recess 5 of the first link 1 to form a counter bore portion 7, and a second link 2 secured to the bushing 6, which dust seal comprises an annular sealing member 8 of wear resistance and resiliency forming sealing surfaces S at both sides thereof with the end surface 6*a* of the bushing 6 and with the bottom surface 5*a* of the recess 5 and the first link 1 and having annular side edges 8*a* and 8*a* and at least one thread 8*b* and contained in the recess 5 of the first link 1 in compressed state, the sealing surfaces S formed by the side edges 8*a* and 8*a* prevent earth and sand from entering into the dust seal, and the compressed sealing member 8 contained in the counter bore portion 7 enables to endure the thrust force. It should also be understood that since the sealing member 8 of the dust seal is contained in compressed state in the counter bore portion 7, it may follow the longitudinal movement of the bushing 6 to maintain good sealing function, and since the thread 8*b* of the sealing member 8 is contacted under pressure with the inner peripheral surface of the recess 5 of the first link 1 in the counter bore portion 7 by the compression to act the same as one lip, it also prevents dirty water from entering into the dust seal.

What is claimed is:

1. A dust seal for endless tracks of a tractor comprising a pin, a first link secured to said pin and having annular recess, a bushing rotatably engaged with said pin and projected at one end into the recess of said first link to form a counter bore portion, and a second link secured to said bushing, wherein said first and second links having a space therebetween and an annular unitary sealing means for wear resistance and resiliency having annular side edges and at least one tread positioned in said counter bore portion in a compressed state, the outer edges of said tread forming a seal with said first link and said side edges forming sealing surfaces with the end surface of said bushing and the end of said recess in said first link and for said sealing means maintaining said space and absorbing the thrust force of the bushing in the direction of the axis of the pin.

2. A dust seal as set forth in claim 1, wherein said sealing means is made of any of urethane rubber, synthetic resin, natural rubber, and metal of wear resistance having resiliency.

3. A dust seal as set forth in claim 1, wherein said sealing means comprises two threads.

* * * * *